COMMAND COMMUNICATION SYSTEM OF THE RECTANGULAR WAVE TYPE

Filed Jan. 8, 1962

8 Sheets-Sheet 1

INVENTOR.
ROBERT J. McNAIR.
BY Alden D. Redfield
Charles M. Hogan.
ATTORNEYS.

INVENTOR.
ROBERT J. McNAIR.
BY Alden D. Redfield.
Charles M. Hogan.
ATTORNEYS.

INVENTOR.
ROBERT J. McNAIR.
BY Alden D. Redfield
Charles M. Hogan
ATTORNEYS.

Dec. 28, 1965 R. J. McNAIR 3,226,643

COMMAND COMMUNICATION SYSTEM OF THE RECTANGULAR WAVE TYPE

Filed Jan. 8, 1962 8 Sheets-Sheet 4

INVENTOR.
ROBERT J. McNAIR.

BY Alden D. Redfield
Charles M. Hogan
ATTORNEYS.

COMMAND COMMUNICATION SYSTEM OF THE RECTANGULAR WAVE TYPE

Filed Jan. 8, 1962 8 Sheets-Sheet 5

INVENTOR.
ROBERT J. McNAIR.

BY Alden D. Redfield
Charles M. Hogan.
ATTORNEYS.

COMMAND COMMUNICATION SYSTEM OF THE RECTANGULAR WAVE TYPE

Filed Jan. 8, 1962

8 Sheets-Sheet 6

INVENTOR.
ROBERT J. McNAIR.
BY Alden D. Redfield
Charles M. Hogan
ATTORNEYS.

INVENTOR.
ROBERT J. McNAIR.
BY Alden D. Redfield
Charles M. Hogan.
ATTORNEYS.

INVENTOR.
ROBERT J. McNAIR.
BY Alden D. Redfield
Charles M. Hogan.
ATTORNEYS.

United States Patent Office 3,226,643

Patented Dec. 28, 1965

3,226,643

COMMAND COMMUNICATION SYSTEM OF THE RECTANGULAR WAVE TYPE

Robert J. McNair, Cincinnati, Ohio, assignor to Avco Corporation, Cincinnati, Ohio, a corporation of Delaware Filed Jan. 8, 1962, Ser. No. 164,671
4 Claims. (Cl. 325—40)

The present invention relates to command transmitters and receivers. It provides a means and method for communicating and receiving guidance commands over a radio link in a fail-safe manner.

Present command communication systems suffer from the difficulties inherent in the transfer of erroneous command data when the radio frequency carrier signal is interrupted or is of insufficient level for proper reception, or in the presence of substantial noise. Currently used systems are further subject to the limitation imposed by the requirement for transmission and reception of zero reference calibration signals preparatory to or during use. An object of the present invention is to provide a guidance command system which is relatively free of the aforementioned disadvantages and limitations of prior art systems.

Another object of the invention is to provide a system which fails safe in the event of a failure of the types discussed above.

In accordance with the invention, the data utilized at the transmitter in the formulation of a command are supplied by distinct tones, as, for example, by an audio tone pair. The rendering of a command is signified by the amplitude proportioning of the tones. Such proportioning constitutes the encoding. After the amplitude ratio of the tones is established in the formulation of the command, the properly proportioned audio signals are applied to a matrix circuit and then employed to amplitude-modulate a suitable carrier or subcarrier.

Among the advantages of the invention is the fact that the outputs of several subcarrier channels, each containing command data encoded in this fashion, can be multiplexed onto a single radio frequency carrier. Additionally, the same radio frequency carrier may have multiplexed thereon additional types of coded data such as voice or binary intelligence. At the receiver the carrier is de-multiplexed, and the subcarrier channels are demodulated to recover the tone pairs. Separation and rectification of the tones make available two signals, the relative power of which, when compared one to the other, will be representative of the encoded command function. The command is then duly executed in the receiver.

In accordance with the invention, the commands are communicated in such a manner that the output of the receiver returns to zero upon the occurrence of a sustained defect in transmission. The invention has the additional advantage that, statistically speaking, noise is self-cancelling.

Another object of the invention is to provide a command transmitting and receiving system which is versatile with respect to the types of data which can be transmitted and received over a radio link. The embodiments herein shown are severally adapted to continuously variable zero-centered commands, commands coded in binary digits, and commands extracted from speech.

It is also an object of the invention to provide a system for the ready transmission of two-dimensional data—that is, commands which control the displacement of an object along two axes of a Cartesian framework of orthogonal coordinates.

A further object of the invention is to provide a command communication system in which a receiver at a remote point executes commands in response to vocal orders uttered at the transmitter.

For a better understanding of the present invention, together with other and further objects, advantages, and capabilities thereof, reference is made to the following description of the accompanying drawings, in which.

Figure 9:
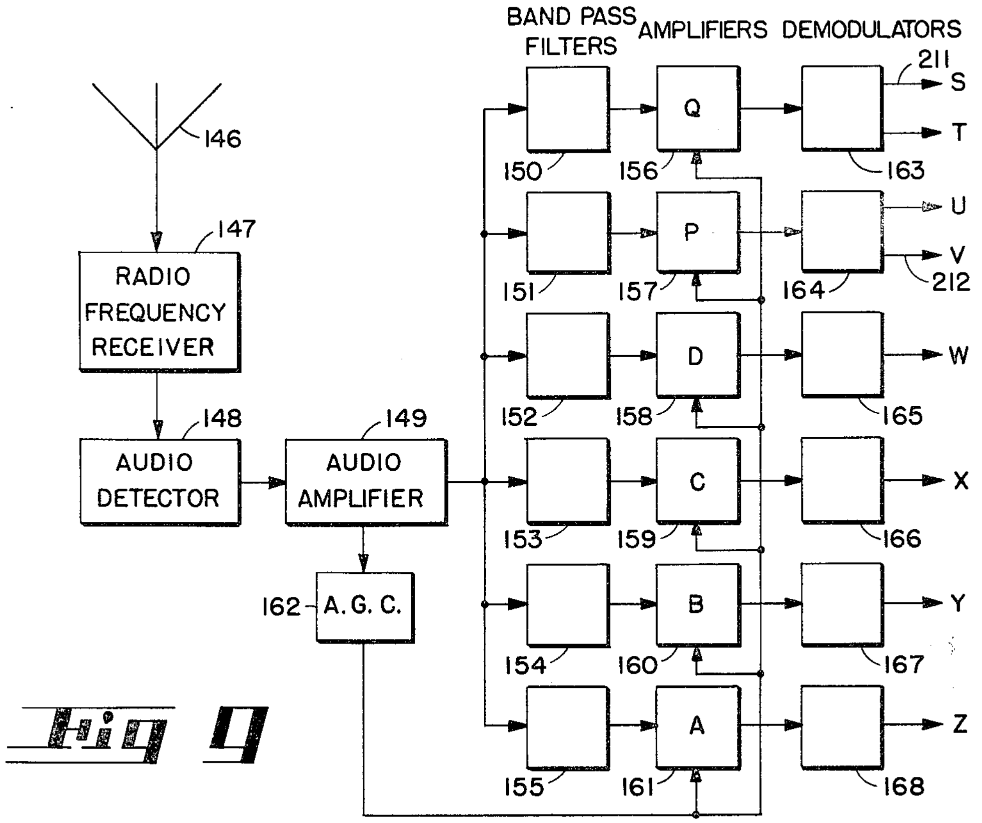
Figure 8:
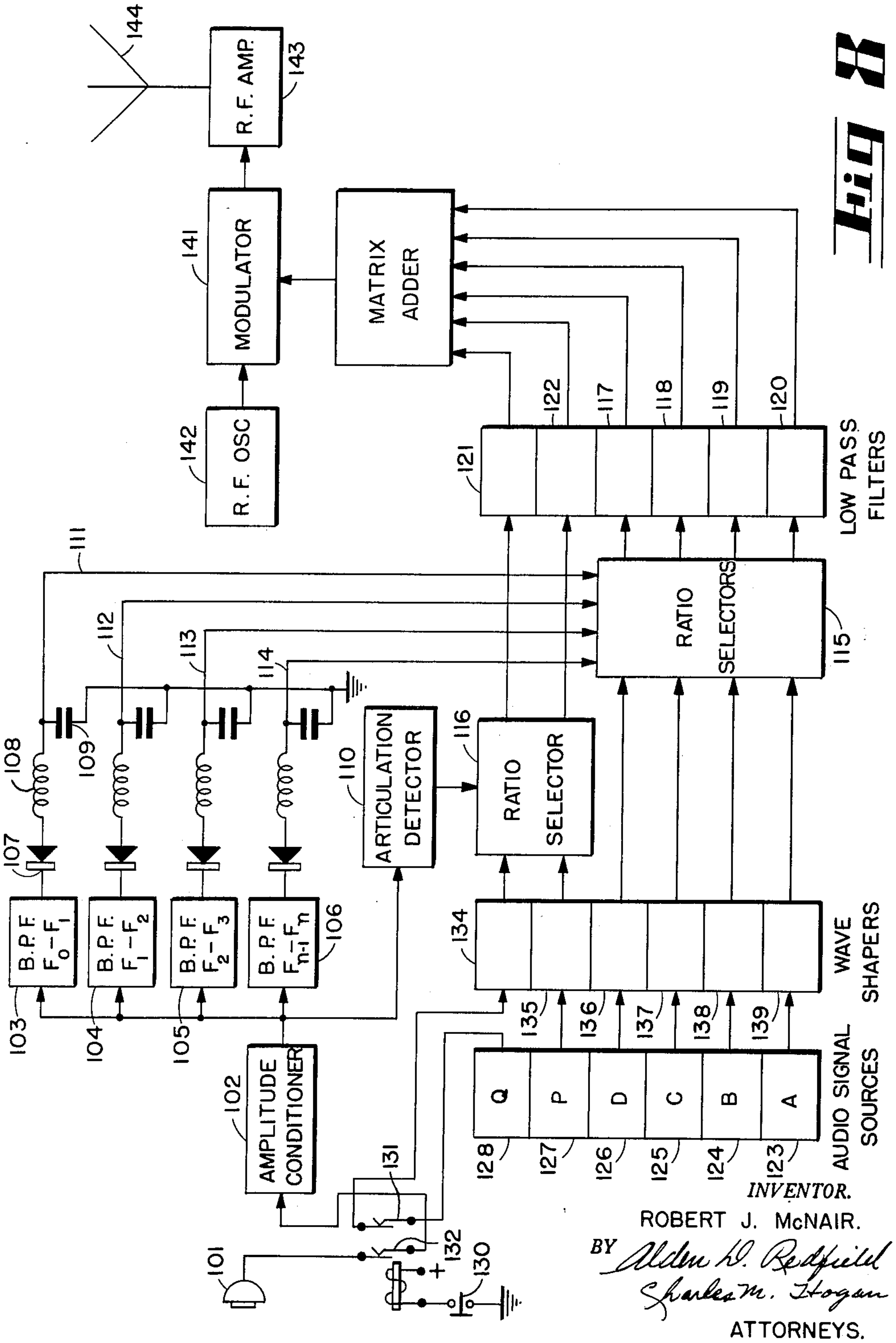
FIG. 8 is a block diagram of a voice command encoder and transmitter in accordance with the invention.
Figure 10:
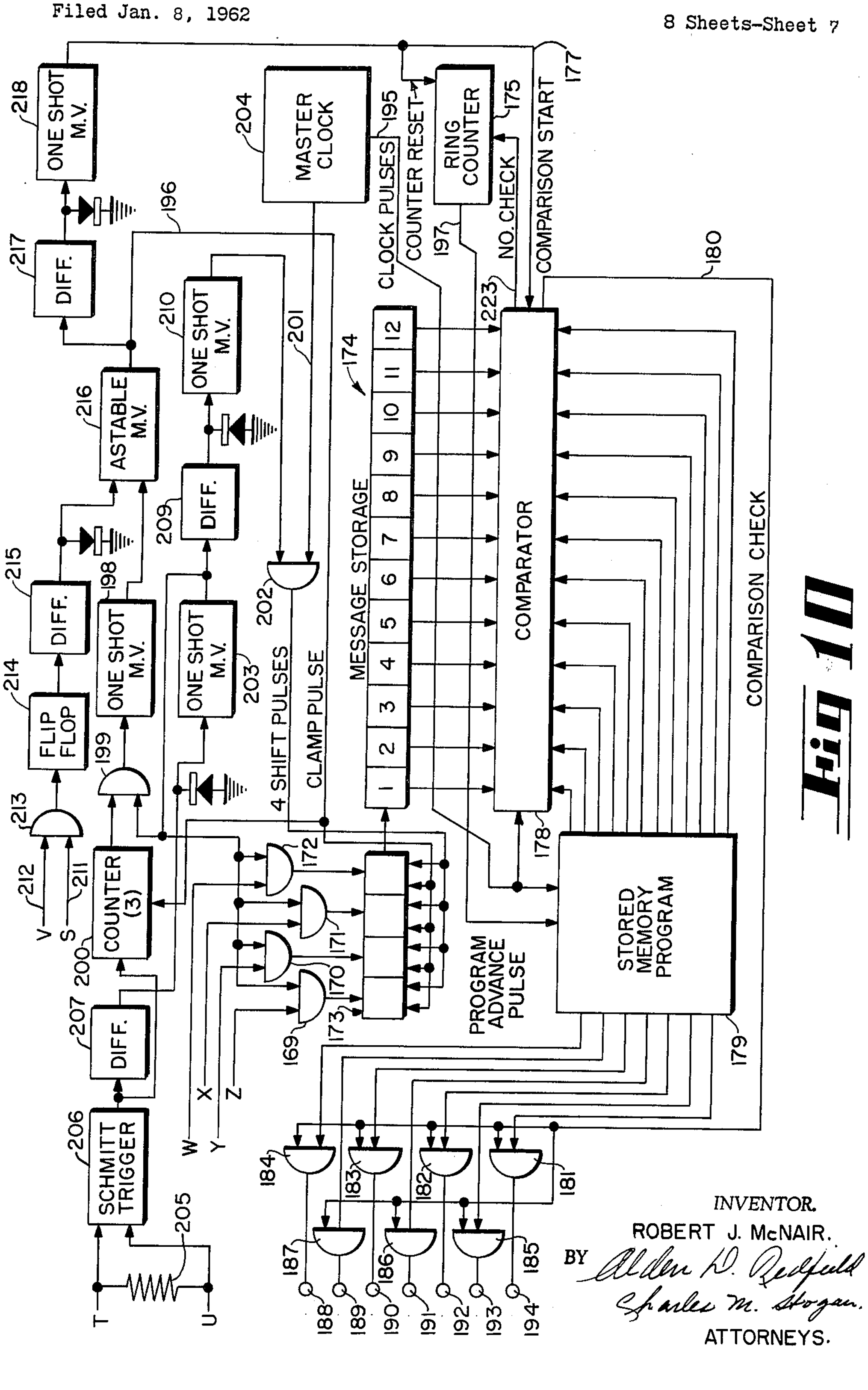
Figure 11:
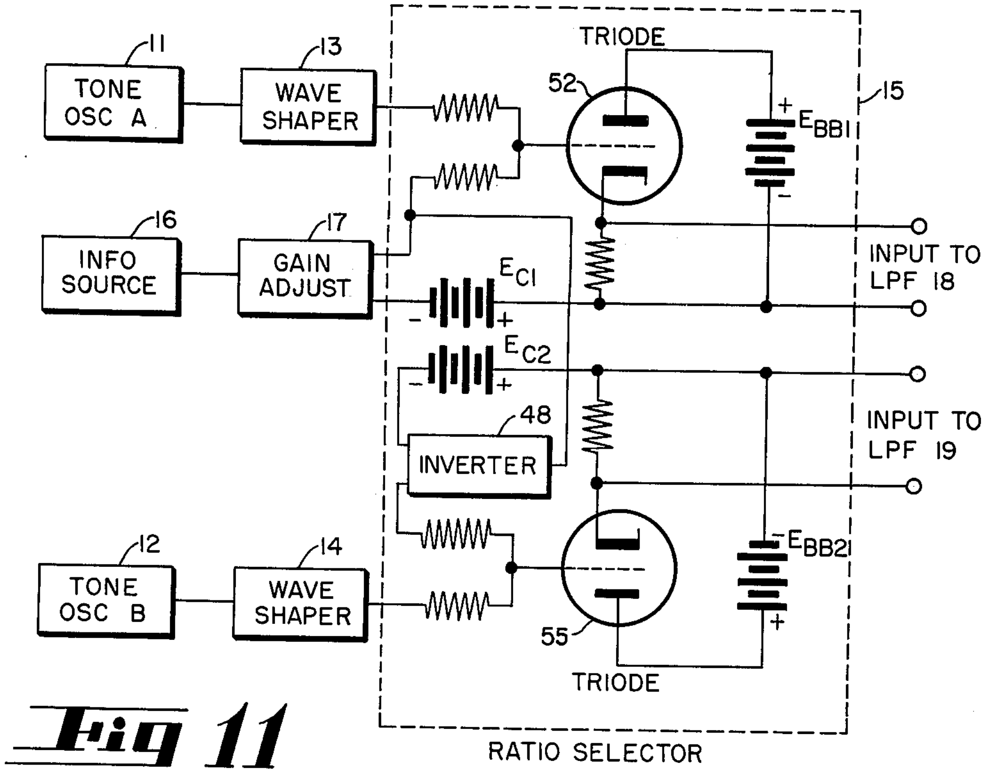
Figure 12:
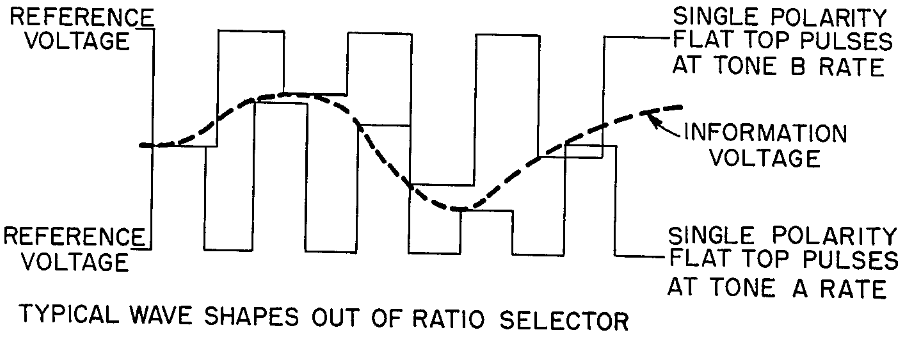

FIGS. 9 and 10, in composite, are a block diagram of a voice command receiver suitable for use with the FIG. 8 transmitter;

FIG. 11 is a block diagram of a ratio selector suitable for use with a data transmitter in accordance with the invention; and FIG. 12 is a set of curves employed in explaining the operation of the FIG. 11 circuit.

Figure 1:
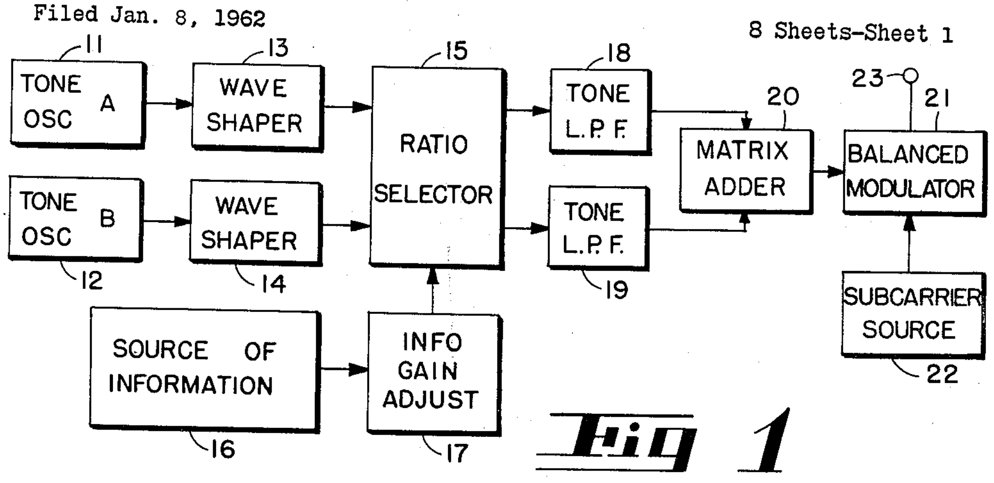
FIG. 1 is a block diagram of a preferred form of data encoder in accordance with the invention and suitable for the transmission of a zero-centered control function.

Referring now specifically to FIG. 1, there is shown that portion of a transmitter which generates the command function. The data which are proportioned to provide a command originate at tone generating devices or sine wave oscillators 11 and 12, for tones A and B. While none of the parameters herein mentioned is intended to constitute a limitation, exemplary frequencies of 80 and 130 cycles per second are offered for purposes of illustration as generated by devices 11 and 12, respectively. It will be understood that other frequencies within the audio and low radio frequency ranges may be employed for the tone outputs of devices 11 and 12, subject to the desirable limitation that the first three harmonics of each tone be neither a multiple of nor adjacent to the corresponding harmonic of the other tone. The sine wave oscillations from the tone generators 11 and 12 are applied to wave-shaping devices 13 and 14, directed to the production of square waves of constant amplitude having fundamental frequencies of 80 and 130 cycles per second, respectively. The square waves are applied to separate channels of a ratio selector device 15. The function of the ratio selector device is to determine the respective amplitudes of the two square wave signals appearing in its output. Those amplitudes and the predominance of one or the other signal in the output are a function of the magnitude and polarity of a control voltage applied to the selector from a source of information 16 via a gain adjustment device 17.

The ratio selector device 15 may comprise any one of several well-known electronic devices which respond to a control voltage (from unit 17) to determine the respective proportions of a pair of outputs. The ratio selector device 15 (see FIG. 11) typically accepts a message wave from the information source 16 as modified by gain adjuster 17 and combines this wave with rectangular pulses from the wave shaper 13. The combined voltage wave is impressed on the grid circuit of triode 52. Sufficient biasing voltage is applied to triode 52 so that the message alone cannot drive the tube into a conducting condition. Pulses from the wave shaper 13 are of constant amplitude and positive polarity. With the message wave at its most negative value, the triode 52 is still driven well into the conducting region because of the amplitude sufficiency of rectangular pulses from the wave shaper 13 (FIG. 12).

The other half of the ratio selector 15 operates in a somewhat similar fashion. However, the input information from gain adjuster 17 is inverted by inverter 48 before being combined at the grid of triode 55 with the rectangular wave from wave shaper 14. Inverter 48 can typically be an operational amplifier having resistive feedback and a gain of unity. The bias voltages $E_{c1}$ and $E_{c2}$ together with the associated plate potential voltages $E_{BB1}$ and $E_{BB2}$ are so chosen that the single polarity flat top pulses present at the dual outputs of the ratio selector are complementary. Typical wave shapes out of the ratio selector 15 are shown in FIG. 12, and the complementary nature of the two output signals is depicted.

The ratio selector device (see FIG. 1) has two outputs coupled to low pass filter units 18 and 19.

The signal outputs of the filters will be described in terms of three illustrative conditions of operation. First let it be assumed that, for a zero voltage information input from unit 17 to unit 15, the 80 and 130 cycles per second shaped waves are each sliced at five units of amplitude. Now then, for an information input of +1 volt, the 80 cycle per second wave from unit 13 could be sliced at six units of amplitude, and the 130 cycles per second wave from unit 14 could be sliced at four units of amplitude. In that event the output wave of unit 18 would predominate in a ratio of 6 to 4 over that of unit 19, as would be appropriate for such a command as "Right turn," for example. On the other hand, for a −1 volt information input signal from unit 17 to selector 15, the ratio of the output amplitudes of the two waves would be reversed, the 80 cycles per second output of unit 13 being sliced at four units of amplitude, and the 130 cycles per second output from unit 14 being sliced at six units of amplitude, as would be appropriate for a command of "Turn left," for example. The representative commands just mentioned simply mean that a receiver executing these commands would cause a robot airplane, for example, to respond in the manner indicated.

The outputs of filters 18 and 19 are coupled to a matrix adder circuit 20, and it in turn is coupled to a balanced modulator 21, the latter being provided with a second input circuit coupled to a subcarrier source 22. The operation of the matrix adder circuit 20, subcarrier source 22, and balanced modulator 21 is such that the 80 and 130 cycles per second waves are combined in the matrix adder circuit and modulated onto the subcarrier, the entire intelligence necessary for the command appearing at output line 23, which is hereinafter referred to as "analog channel No. 1." The ratio selector 15 provides analog information in the sense that the respective magnitudes of the two signals at 18 and 19 measure the quantum of the command or magnitude of the response thereto, also the direction. In order to control the intermodulation products of the two tones as applied to the matrix adder device 20, it will generally be desirable to maintain a constant phase relationship between them. This can be accomplished by generating both tones from a single higher frequency source which generates a harmonic of both. However, the intermodulation products vary no more than 6% even when the tone sources are not coherent.

Figure 2:
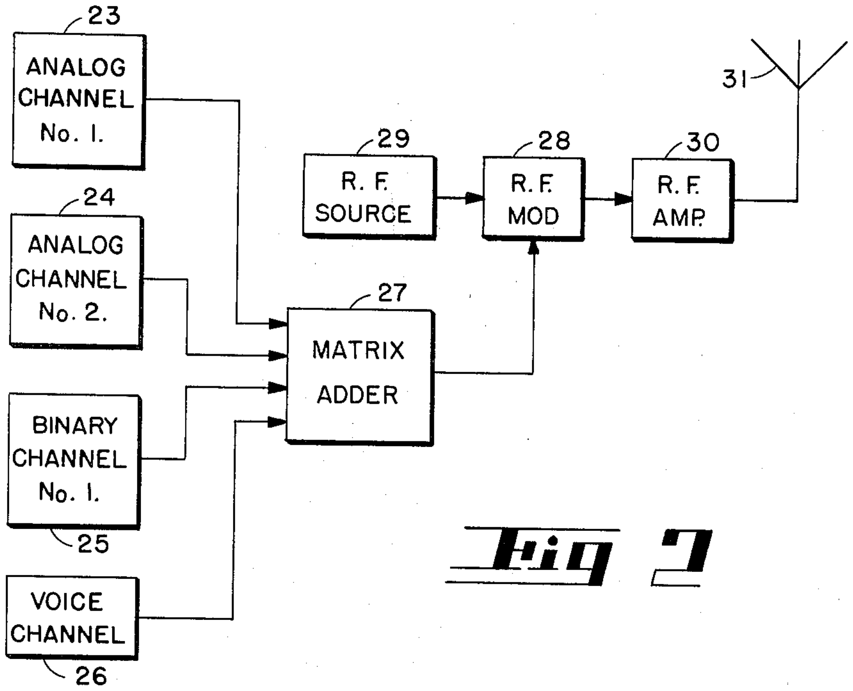
FIG. 2 is a block diagram of a data transmitter in accordance with the invention, including a plurality of analog channels corresponding to the FIG. 1 output as well as other sources of data for multiplexing onto a common carrier.

Referring now to FIG. 2, the block entitled "ANALOG CHANNEL NO. 1" is representative of the output of the entire encoder illustrated in FIG. 1, and is therefore given the reference numeral 23; that is to say, the command signal output from an analog data encoder appears at element 23. Other command information modulated onto another subcarrier can be presented in a separate channel 24. Similarly, binary information and voice channel information can be made to appear in channels 25 and 26. The outputs of all of the channels are applied to a matrix adder device 27 and modulated in a suitable unit 28 onto a single radio frequency carrier originating in oscillator 29. Preferably the carrier, frequency multiplexed in the manner indicated, is amplified by amplifying unit 30 before radiation from antenna 31. The system of the present invention is particularly suitable for frequency multiplexing of subcarrier-borne commands and intelligence onto a single carrier.

Figure 3:
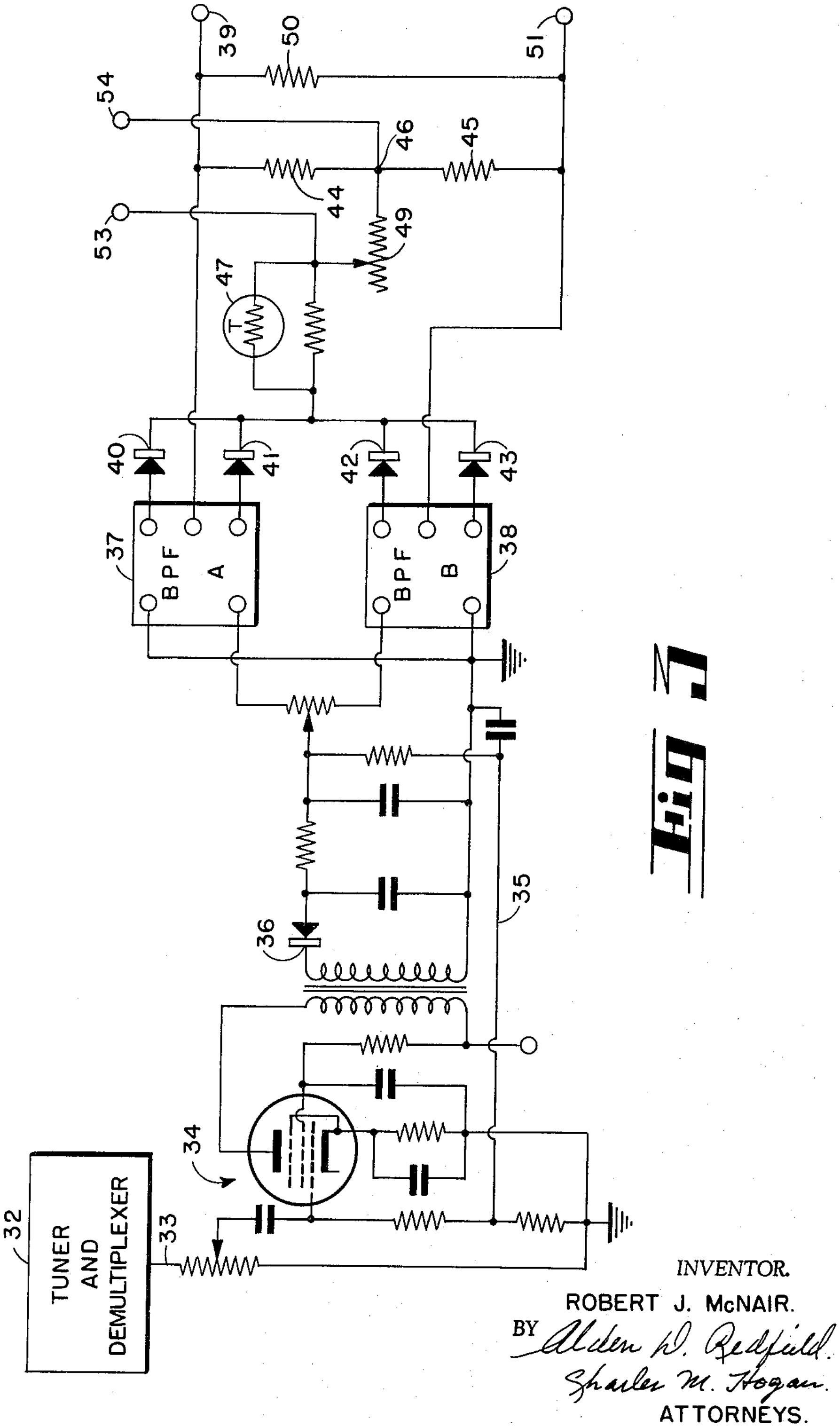
FIG. 3 is a block diagram of a receiver suitable for use with the FIG. 1 encoder or FIG. 2 data transmitter and for the reproduction of a zero-centered control function.

Reference is now made to FIG. 3 in discussing the means by which the command information is recovered at the receiver. The reference numeral 32 designates suitable wave-intercepting, tuner, and de-multiplexing equipment appropriate for the isolation and retrieval of the modulated subcarriers, and it will be assumed in this discussion that the intelligence appearing on line 33 is that pertinent to analog channel No. 1. The modulated subcarrier is amplified in amplifier 34, which is proportioned to furnish a constant-amplitude signal output, this being achieved by provisions for stable automatic gain control, including gain control line 35. The construction and operation of the amplifier 34 per se are well known to those skilled in the art and need not be described in detail herein. The amplifier is coupled to a demodulating rectifier or detector 36, the output of which is a composite wave containing the two tones originating at generators 11 and 12, the components of that composite having an amplitude ratio corresponding to that provided or encoded by the ratio selector device 15. It will be understood that the demodulator is provided with a suitable load and gain-control-developing networks.

The aforementioned composite signal is applied through a suitable balancing network to band pass filters 37 and 38, the latter being designed and proportioned to separate out and to isolate the two tones.

The signals appearing at the output of the filters 37 and 38 are audio tones corresponding to those on the units 18 and 19. The neutral center tap output winding connections of filters 37 and 38 are connected to terminals 39 and 51 for the purpose of furnishing commands to the electro-mechanical or other devices which execute them.

The foregoing demonstrates that zero-centered balanced neutral signals are supplied at the information output 39, 51 for such purposes as left and right steering commands, left and right bank commands, climb and dive commands, or similar orders used in the remote control of vehicles traveling on land, sea, or in the air.

D.-C.-wise, the outputs of units 37 and 38 are coupled to a thermal resistor bridge network comprising diodes 40–41 and 42–43 (each pair of diodes constituting the arm of a bridge) and resistors 44 and 45, symmetrically arranged and having a junction at 46. A series combination of thermal resistor 47 and rheostat 49 is connected from junction 46 to the junction of diodes 40–43, and a resistor 50 is connected across output terminals 39 and 51. The thermal resistor 47 is an optional feature. If the signal level at the output of the demodulator 36 is not constant, the rectified outputs of the filters 37 and 38, while being of constant ratio, may vary in absolute magnitude. The thermal resistor compensates for this undesired variation. A second output comprising terminals 53 and 54 is taken across rheostat 49 as a reference threshold voltage. In the event of either absence of tone or absence of the carrier, the signal level at output terminals 53, 54 discloses the existence of a failure.

Among the advantages of the FIG. 3 system are these:

(1) Transmission noise is reduced;

(2) In the event of a momentary loss of signal, the commanded vehicle will maintain its existing course and will not veer away from it;

(3) No zero calibration signal need be transmitted before or during usage, for the reason that the zero signal level depends only on the balance of energy contained in the two audio tones.

Figure 4:
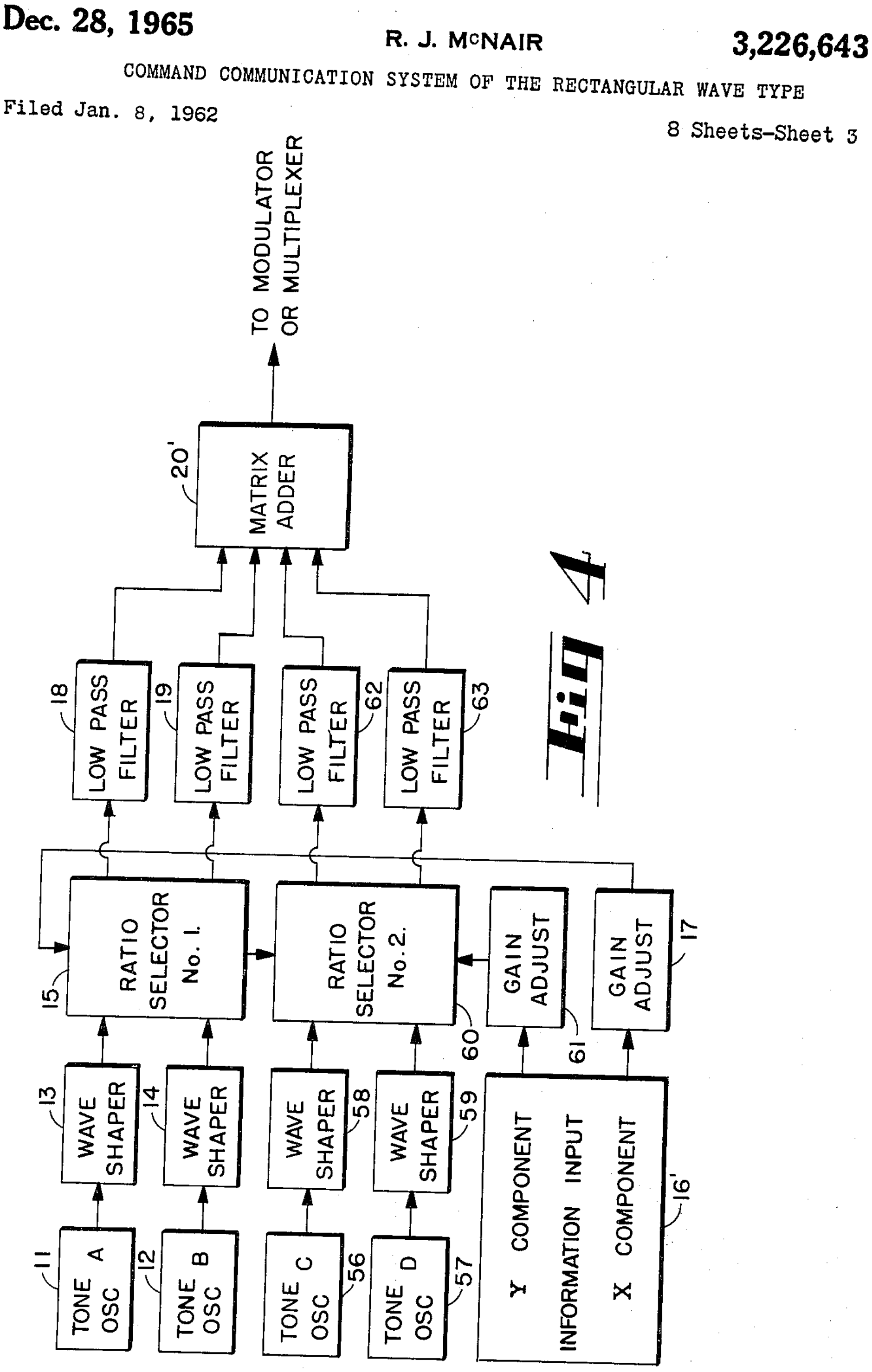
FIG. 4 is a block diagram of an analog data encoder providing data in two dimensions.

While the FIG. 4 embodiment shows a novel combination, it is explained as a pluralizing of the FIG. 1 embodiment. Tones A and B are pertinent to a command to be given to a vehicle in one coordinate, as for example the X plane (i.e., to steer right or left); tones C and D are pertinent to a command referring to another plane, for example the Y plane (i.e., to dive or climb). It is for this reason that the FIG. 4 embodiment is referred to as a bidimensional or "two degrees of freedom" data encoder. Those elements of FIG. 4 which are identical to the FIG. 1 elements are designated by like reference numerals, and those which are similar are designated by like reference numerals primed, in order to avoid repetitious discussion. That is to say, the elements 16′, 11–15, 17–19, and 20′ furnish the command for the X plane; the similar elements 16′, 56, 57, 58, 59, 60, 61, 62, and 63, together with matrix adder circuit 20′, furnish the command information for the Y plane. The element 16′ supplies both information inputs. The output of the matrix adder circuit 20′ is treated in the same manner as the output of matrix adder 20 in FIG. 1, both X and Y commands being modulated on the same subcarrier.

The FIG. 4 embodiment conveys balanced neutral zero-centered signals and transmits "two degrees of freedom" commands to a remote site. In other words, it accomplishes complete joystick control, the desired orietnation of the controlled element being accomplished by supplying both X and Y components. Command data of this kind are encoded by the proper selection of the amplitude ratio of four audio tones A, B, C, and D. Sidewise motion of the sender's control stick is accordingly specified as commands along a positive or negative X axis. The forward and back components of motion of the sender's control stick are specified as commands along the positive or negative Y axis.

It is well understood that any command which corresponds to a specific displacement of the sender's control stick can be resolved into X and Y components. For the reasons stated, proper selection of the amplitude ratios of the four audio tones conveys to a remote receiving station complete positional information with respect to the sender's control stick. Tones A and B encode the direction and magnitude of control stick displacement along the X axis. Tones C and D encode the displacement along the Y axis. Each pair of amplitude-proportioned audio tones is transmitted in a manner similar to that of FIG. 1. While the X and Y components of motion may be separately modulated onto subcarriers, it is preferred that all four audio tones be matrix added and modulated onto a single subcarrier.

Figure 5:
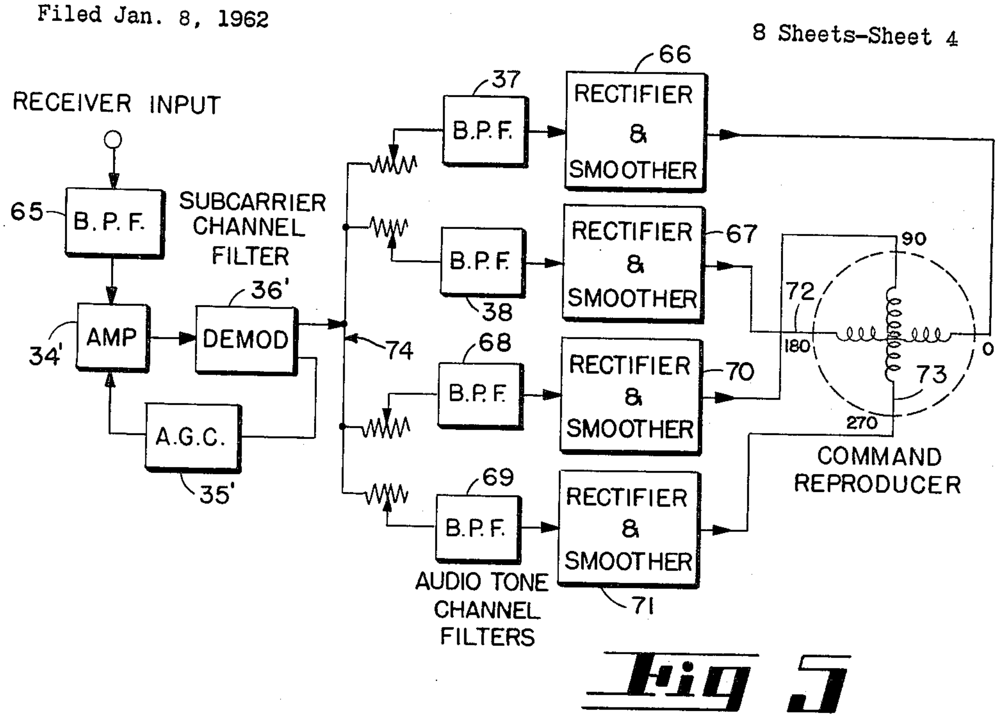
FIG. 5 is a block diagram of a data decoder suitable for use with the FIG. 4 encoder.

A suitable receiver for use with the FIG. 4 embodiment is block-diagrammed in FIG. 5. Again the tuner and elements for recovering the subcarrier are not shown in FIG. 5. Suffice it to say that the recovered subcarrier is applied to a band pass filter 65 and then via an amplifier 34′ to a demodulator 36′, constancy of signal amplitude being maintained by an automatic gain control device 35′. Those elements in FIG. 5 which are like elements in FIG. 3 are given the same reference numerals, and those which are generally similar are designated by identical reference numerals primed. After demodulation the tone outputs A and B of 37 and 38 are rectified by rectifier devices 66 and 67, and the tones C and D pass through band pass filters 68 and 69 and are similarly rectified in devices 70 and 71. The outputs of rectifiers 66 and 67 are applied to the terminals of one winding 72 of a reproducer in the form of a split-phase motor or bidirectional device of similar character, and the outputs of rectifiers 70 and 71 are similarly applied to quadrature winding 73 of such command reproducer. A balancing network generally indicated by the reference numeral 74 is interposed between the demodulator 36′ and the band pass filters, for adjusting the tone channels to a desired balance.

As is well known to those versed in the remote control art, angular position and displacement of a controlled element may also be completely determined in terms of the proportions of three commands applied in three-phase space displacement.

Figure 6:
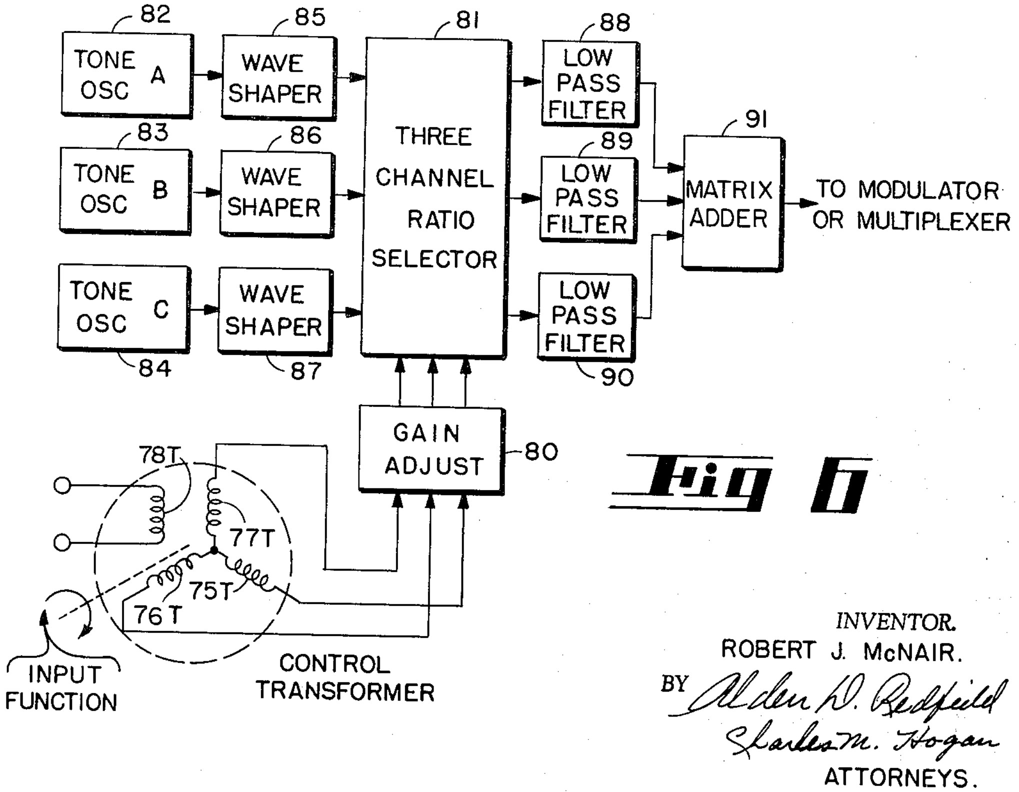
FIG. 6 is a block diagram of a "three-phase" data encoder which supplies data for two dimensional control.
Figure 7:
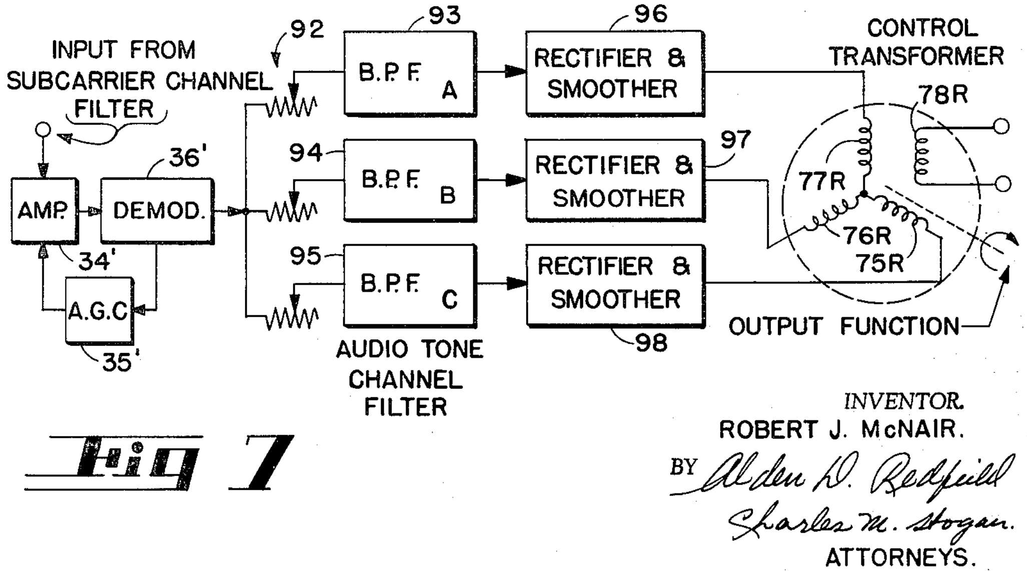
FIG. 7 is a block diagram of a "three-phase" data decoder for use with the FIG. 6 encoder.

Referring generally and parenthetically to FIG. 7, a "three-phase" decoder, the magnitudes of the voltages applied to the windings 75R, 76R, and 77R (FIG. 7) of a synchro device, those windings being 120 degrees space displaced from each other, determine the orientation of the synchro rotor 78R. The operator at the transmitting end is provided with a synchro transmitter or control transformer, as illustrated in FIG. 6, having Y-connected phase-displaced windings 75T, 76T, and 77T, and a rotor 78T. The position of the rotor 78T determines the voltages in the winding 75T–77T, and those windings in turn determine the amplitude proportions of the control signals applied through a gain adjustment device 80 to a three-channel ratio selector device 81. That is to say, the positional data are supplied in terms of the relative proportions of audio tones A, B, and C, the latter being supplied originally by audio signal generators 82, 83, and 84, and processed via wave shapers 85, 86, and 87 into a three-channel ratio selector 81. The three outputs of the ratio selector are severally applied to the low pass filters 88, 89, and 90, matrix added by device 91, and multiplexed on a suitable subcarrier or carrier in the manner previously described.

Reference is now made specifically to FIG. 7, which shows a decoder suitable for use in a system including the encoder of FIG. 6. Again there are shown an amplifier 34′, demodulator 36′, automatic gain control expedient 35′, balancing network 92, band pass filters 93, 94, and 95, and rectifying networks 96, 97, and 98, the latter being coupled, respectively, to the windings 77R, 76R, and 75R, so that the rotor 78R is commanded to the ordered position.

From the foregoing it will be seen that angular displacement can be accomplished either by X and Y commands or by effectively 120 degrees displaced commands.

FIGS. 8 and 9–10 are directed to encoder-transmitter and decoder-receiver arrangements, respectively, for the remote control or programming of machines by verbally initiated instructions. The discussion postulates a predetermined set of phrases or statements in an ordered sequence.

It has been shown in the prior art that verbal commands may be encoded by quantizing their phonetic content into certain sequences. Speech can be calssified on a short time spectrum basis. Basically the speech wave train has three main phonetic characteristics. In the vowel portions of words resonances predominate. The fricatives involve broad distribution of semi-random energy. The plosives contain sharp bursts of energy. That portion of FIG. 8 which is located above the ratio selectors and to the left of the R.F. oscillator comprises a phonetic pattern recognizer per se of the prior art. Speech impressed on a microphone 101 is applied to an amplitude conditioner 102, designed to equalize gain over a large range of frequencies, and the speech wave train from the conditioner 102 is filtered by a set of band pass filters 103, 140, 105, and 106, covering the audio frequency spectrum from 200 to 3200 cycles per second. The edge frequencies of the filters are adjacent. While only four representative filters 103–106 are illustrated in FIG. 8, the number actually required for any specific application depends on the complexity of the verbal commands employed. Typical band edge frequency values for a set of seven filters might be as follows: 200–500, 500–800, 800–1100, 1100–1500, 1500–2000, 2000–2600, and 2600–3300 cycles per second. Associated with each filter is a rectifier and low pass filter as shown, one set being designated by the reference numerals 107 and 108–109. These smooth the tonal component of speech power to a syllabic rate.

The output of conditioner 102 is also applied to an articulation detector 110 which measures the duration of each phonetic pattern, in that it takes into account the motions of the speaker's vocal mechanism in segmenting the specific discrete tonal sounds through the interspersion of plosive and fricative consonants between the vowel sounds. The outputs from the pitch channels (i.e., 111, 112, 113, and 114) and the articulation detector 110 are then encoded onto a plurality of discrete audio channels by means of the ratio selectors 115 and 116, respectively, there being audio channels and low pass filters 117, 118, 119, and 120 for each tonal component. As to the articulation detector 110, its output controls the proportions in which tones from units 134 and 135 are encoded in the audio channels, inclusive of low pass filters 121 and 122.

It will be understood that audio tones are generated by the signal sources 123, 124, 125, 126, 127, and 128. Those from sources 123–126 are shaped and then amplitude-proportioned in ratio selector 115. Those from sources 127 and 128 are amplitude-proportioned in ratio selector 116. The filter outputs appearing on lines 111–114 are "yes" or "no," or digital, outputs, and these "yes" or "no" outputs determine which of the tones from sources 123–126 will be applied to the filters 117–120 and ultimately transmitted and which will not, the result being that digitally encoded signals appear at the outputs of low pass filters 117–120. The articulation detector 110, working through the ratio selector 116, furnishes an indication at the output of filters 121 and 122 as to the end of each syllable.

The articulation detector 110 is defined as a pressure-sensing device capable of analyzing the composite wave front of the voice signal addressed to the command equipment. It is not specifically referred to by the title here assigned—i.e., articulation detector, but functions as described in the following Bell Telephone System Technical Publications:

Monograph 3172, by H. Dudley and S. Balashek, "Automatic Recognition of Phonetic Patterns in Speech; Phonetic Vocoder"

Monograph 2167, by B. P. Bogert, "On the Band Width of Vowel Formants"

Monograph 3126, by J. L. Flanagan, "Some Properties of the Glottal Sound Source"

Monograph 2048, by W. E. Kock, G. E. Peterson, K. H. Davis, R. Biddulph, S. Balashek, R. L. Miller, "Automatic Speech Recognition"

Monograph 2744, by E. E. David and H. S. McDonald, "Note on Pitch-Synchronous Processing of Speech"

Monograph 2648, *by H.* W. Dudley, "Fundamentals of Speech Synthesis."

Another use is made of the audio signals originating in units 127 and 128 and proportioned by ratio selector 116. As will be seen in the discussion of the receiver, these audio signals are used to clear the receiver decoder preparatory to reception of a command message. Suffice it for the present to say that the pressing of the microphone relay button 130 (FIG. 8) closes relay contacts 131, which inserts the tone from unit 128 into the audio spectrum. Initial presence of tones from both of units 127 and 128 in the received signal spectrum clears the message storage system in the decoder, as more fully explained hereinafter. The relay contacts 131 are shown in closed position in FIG. 8. The relay additionally closes the circuit between microphone 101 and amplitude conditioner 102 via contacts 132.

The audio signal tones are converted into square waves of constant amplitude by the wave shapers 134, 135, 136, 137, 138, and 139. The outputs from the wave shapers are applied to the ratio selectors 115 and 116 and amplitude proportioned. The outputs of all of the low pass filters are matrix added and modulated onto a carrier by modulator 141, the reference numerals 142, 143, and 144 indicating an R.F. power oscillator, R.F. amplifier, and antenna of conventional character.

Referring now to FIGS. 9–10, there is shown in block diagram a voice-command receiver suitable for use with the FIG. 8 transmitter. It comprises a receiving antenna 146 (FIG. 9), radio frequency tuner 147, audio detector 148, audio amplifier 149, suitably arranged in cascade, and other units now described. The output of the audio amplifier is coupled to a plurality of filters 150, 151, 152, 153, 154, and 155, proportioned to recover the tones Q, P, D, C, B, A, corresponding to the outputs of units 121, 122, 117, 118, 119, and 120. These recovered audio tones are amplified in amplifiers 156, 157, 158, 159, 160, and 161, each of which is supplied with a forward acting gain control voltage from a gain control network 162. The audio amplifiers are respectively coupled to demodulators 163, 164, 165, 166, 167, and 168. The outputs of the demodulators 168–165 are individually connected to "and" gates 169, 170, 171, and 172 of the system shown in FIG. 10, which gates function in parallel to deliver a four-bit word to the temporary store or register device 173. Unit 173 includes four binary devices adapted to indicate by binary 1 or 0 states the presence or absence of command data tones at the outputs of the demodulators 165–168.

It will be observed that the demodulators 163 and 164 have two outputs. The outputs on lines 211 and 212, designated V and S, are utilized when the push button 130 (FIG. 8) is depressed, as will be explained hereinafter, those outputs being connected to the "and" gate 213 (FIG. 10). The outputs designated T and U (FIG. 9) are coupled to a resistor 205 (FIG. 10) for the purpose of controlling certain events which occur during the storing of a syllable of four bits, other events which occur after the storing of a syllable (in device 173), and still other events which occur on the storage of a complete three-word command in device 174. The outputs of the demodulators for tones D, C, B, and A, respectively, are designated W, X, Y, and Z (FIG. 9) and are applied, respectively, to gates 172, 171, 170, and 169 (FIG. 10).

The temporary storage device 173 is associated with a three-word storage device 174 which has twelve bistable elements and therefore a three-word capability, each word having four bits. During reception of a command and operation on its data, three four-bit words are transferred from the temporary store 173 to the permanent store 174. After completion of permanent storage, an order to a comparator unit 178, to perform the comparison function, is given. The comparator unit is associated not only with twelve bistable elements in the permanent store 174, but also with a programmed stored memory device 179, in such a way that the three-word command message appearing in the permanent store is compared in turn with the several three-word type commands permanently stored in the programmed memory. If this message corresponds to one of the type commands, then the comparator indicates such correspondence by an order furnished over line 180 to the plurality of "and" gates 181, 182, 183, 184, 185, 186, and 187, one "and" gate being supplied on each output of the programmed memory 179, so that the program is released to the appropriate one of output terminals 188, 189, 190, 191, 192, 193, and 194, and the requisite command function is accordingly performed.

Attention is now directed generally to these principal elements of FIG. 10:

*Trigger 206*, connected across resistor 205, which trigger takes one step at the end of each syllable (four-bit word).

*Counter 200*, coupled to trigger 206, which counter counts to three and indicates the end of a command (three words). Counter 200 is reset when a clamping voltage appears on its input from line 196.

*Multivibrator 198,* coupled to counter 200 by "and" gate 199. Multivibrator 198 is triggered by coincidence between an output wave which counter 200 produces on the third count, and an output wave from multivibrator 203.

*Astable multivibrator 216,* which has two inputs, one of which is coupled to counter 200, via 199, 198, so that device 216 generates a clamping voltage on line 196. This clamping voltage is placed on that line after processing of three words by store 173.

The units 206, 199, 198, and 216 constitute means responsive to the reception of the three-word command to put a clamping voltage on line 196 and to inhibit the further use of the store 173 and counter 200 until the flip-flop 216 is reset.

Attention is now invited to:

*"And" gate 213,* coupled to inputs V and S, which responds to the presence of tones on both inputs, as when button 130 (FIG. 8) is depressed, to actuate flip-flop 214, coupled to gate 213, to send the device 216 a pulse, differentiated in 215, which resets device 216 and removes the clamping pulse from line 196.

It will be seen from the foregoing that the device 216 is tripped on the third count of device 200 (after reception of a complete command) to condition the FIG. 10 system to accept no additional words. Device 216 is reset to condition the system of FIG. 10 to accept a new command.

The multivibrator 203 has outputs coupled to "and" gates 169–172 and is coupled, via differentiating circuit 207, to the Schmitt trigger circuit 206. This device 203 is "on" during reception of a four-bit word or syllable, to open "and" gates 169–172 so that bits from tone channels W–Z are gated into the four units of the temporary storage device 173. Device 203 is turned "off" at the end of each word to produce a negative going voltage wave which is differentiated by circuit 209 and used to trigger multivibrator 210. Device 203, in addition to the output to circuit 209, also has an output to "and" gate 199. The "on" time of device 210 is sufficient to gate four shift pulses from clock 204, through "and" gate 202, to shift a four-bit word from temporary storage 173 to storage device 174.

The elements 207, 203, 209, 210, and 202 are cascaded and, in combination, they cause each four-bit word to be gated into store 173 (where the word appears as a series of binary 1's and 0's) and then shifted into store 174.

Clock 204 is coupled, via line 201 and "and" gate 202, to the four units of the temporary store 173 to supply the shift pulses.

Another important function performed by device 216 (after reception of an entire three-word command), when it is triggered, is to initiate the comparison operation.

Assuming the presence of a three-word message or command in storage device 174, the next function of significance is the comparison of that message with one of several standard or type commands stored in a memory device 179, for the purpose of determining whether the message in device 174 corresponds to one of the type commands and is accordingly acceptable. When such correspondence is achieved, then the appropriate command is issued out of the unit 179 to one of its seven output "and" gates 181–187. To the end that the comparison operation be initiated, multivibrator 216 is coupled, via a differentiating network 217 and a multivibrator 218, to a "comparison start" line 177.

The comparison start line is a controlling input to comparator device 178. The message storage device 174 has twelve data inputs to the comparator, and the stored memory program device 179 also has twelve data inputs to the comparator. The first pulse on line 177 causes the comparator 178 to compare the message in device 174 with the first one of the type commands in the memory 179. If the comparison is satisfied, then the comparator sends over output line 180, designated the "comparison check" line, a pulse which opens that one of the gates 181–187 which corresponds to the satisfied type command.

In the event that the comparison with the first type command is not satisfied, then the comparator sends over a "no check" line 223 to a ring counter device a pulse which indicates this fact, whereupon the ring counter device sends over line 197 a "program advance pulse" which directs that a new comparison be made between the second type command in device 179 and the message in device 174. Such comparisons continue until the comparator device is satisfied, and accordingly the ring counter attains a maximum count of seven.

The operation of the FIG. 10 system is now described:

In any storage arrangement of this kind, a clamping expedient is required. Each of the bistable units of the temporary store 173 is provided with a connection to a clamp line 196. Clamping occurs automatically at the end of a properly phrased command. That is, for the example shown here, clamp occurs at the end of a three syllable command made up of four bits per syllable or twelve bits total. The clamp function occurs as follows. Each positive going step of Schmitt trigger 206 steps counter 200 one count. Counter 200 is a three step counter, so after three advances by Schmitt trigger 206, there will be an output pulse from counter 200 to "and" gate 199.

The output of Schmitt trigger 206 is also differentiated by differentiator 207 and the negative going pulses trigger multivibrator 203. Thus, there will be an output from multivibrator 203 which is coincident with the output from counter 200 at the conclusion of the third received syllable. Coincident pulses at the input of "and" gate 199 allow a binary 1 pulse to be passed by gate 199. The binary 1 pulse passed by gate 199 does two things. Firstly, it triggers multivibrator 198, and secondly, it initiates the comparison start pulse along line 177.

The triggering of multivibrator 198 creates a pulse which trips flip-flop 216. In its tripped state flip-flop 216 generates a clamping voltage on line 196 which inhibits further use of temporary store 173 and counter 200 until flip-flop 216 is recycled to its rest state by a pulse from differentiator 215.

The discussion returns now to a consideration of the functions performed by the outputs of ratio selector 116 (FIG. 8), and accordingly the signal output of the demodulators 163 and 164 (FIG. 9). Output signals from demodulators 163 and 164 are used for two purposes. Firstly, by means of lines 211 and 212 they are connected to "and" gate 213. With this connection, the closing of button 130 of FIG. 8 will insert binary 1 signals at both line 211 and line 212. This causes gate 213 to conduct, unclamping line 196 via flip-flop 216. Release of the clamp pulse clears temporary store 173 and clears counter 200, resetting it to zero. The system is thus ready for receipt of a new command message.

A second purpose for which the outputs of the demodulators are used consists of the voltage impressed on resistor 205 (FIG. 10). The current flow in resistor 205 switches polarity as a function of the syllabic rate of the speech encoded at the transmitting end of the system by the articulation detector 110 (FIG. 8). This zero-centered polarity-reversing signal actuates the Schmitt trigger circuit 206 (FIG. 10). At the end of each syllable or word, for the case where a one syllable word is used as a command, the state of trigger circuit 206 reverses, and the negative going portion of the output, when differentiated by differentiator 207, is used to trigger one-shot multivibrator 203.

During the "on" time of multivibrator 203, "and" gates 169, 170, 171, and 172 are opened, and the information present on lines W, X, Y, and Z will be gated into temporary storage register 173, providing, of course, that the clamp pulse on line 196 has been removed. On a time sequence basis the clamp signal on line 196 will have been removed, as has already been discussed above.

When multivibrator 203 shuts off, "and" gates 169–172 close, the negative going voltage in the output of 203 is differentiated by differentiator 209, and one-shot multivibrator 210 is triggered. The "on" cycle of multivibrator 210 opens "and" gate 202. The "on" duty cycle of multivibrator 210 is just sufficient to gate four shift pulses through "and" gate 202. These shift pulses come from master clock 204 and are used to shift the information from temporary storage register 173 into message storage register 174.

It has been stated that the band pass filters 150–155 separate out the several individual tones. These filters can be narrow band units because the incoming composite audio signal is made up of discrete tones, each of which varies in amplitude but not in frequency. The outputs from the band pass filters serve as inputs to the amplifiers 156–161, the gain levels of which are established by a common source 162 of forward AGC. The outputs of all of the demodulators 163–168 are in the form of D.C. voltages, each having one of two voltage levels. One level signifies the binary digit 1, and the other level the binary digit 0.

As each syllable of the command is voiced at the transmitter, demodulators 165–168 will each assume that particular 1 or 0 binary level sequence which reflects the frequency content of the speech wave train. On a time basis, the conclusion of each syllable will initiate the previously explained gating sequence of the one-zero status of demodulator output lines W, X, Y, and Z through gates 169–172 into temporary storage register 173. Before a new command syllable is voiced, the information in temporary store 173 will be shifted into message storage register 174.

Receipt of a three syllable command will fill message storage register 174. The data initially in temporary storage 173 at the completion of the first syllable will be in bit registers 9–12 at the end of a three syllable command. Inadvertent transmission of a four syllable command will not change the status of the message storage register 174 after the third syllable because of the clamp pulse feature set up on line 196 by astable multivibrator 216.

When astable multivibrator 216 is triggered by one-shot multivibrator 198, the rising step is differentiated by differentiator 217, and the positive going pulse used to trigger multivibrator 218. The triggering of multivibrator 218 causes a pulse to be sent along line 77 which initiates comparison between the message stored in register 174 and the stored program brought one word at a time from memory 179 to comparator 178.

One of the stored memory type commands, twelve bits in length for the example presented here, will always be present in comparator 178. After receipt of the comparison start pulse, the message in message storage 174 is compared on a bit by bit basis with the message or type command in comparator 178. If the two commands are not the same, a "no" check pulse is transmitted along line 223 to advance counter 175 by one step.

Advancement of counter 175 by one step causes a program advance pulse to be sent along line 197. This causes the twelve-bit type command in the comparator to be replaced by the next consecutive type command in memory 179. The new type command in comparator 178 is then checked on a bit by bit basis against the message in message storage 174. If this message does not check, the program will again be advanced as explained above. This procedure will continue, with the command in message storage 174 being checked against all the type commands in memory storage 179, one command at a time, until the ring counter has cycled a full count. Ring counter 175 is reset each time a comparison start pulse is received from multivibrator 218.

If the message in message storage 174 checks on a bit by bit basis with any of the type commands in memory storage 179, a signal will be sent out along line 180. This signal will open "and" gates 181–187. Simultaneously, there will be a binary 1 level signal present at that particular "and" gate 181–187 which corresponds to the type command in memory storage 179 which is in comparator 180. The result will be an actuate command signal present on one of the output lines 188–194. For example, assume that type command three in memory checked with the command in message storage 174. This would mean that "and" gate 183 would conduct, and output line 190 would have an actuate command signal initiated. Whenever a comparison check pulse is initiated, there will be no further stepping of the ring counter until the entire receiving system has received a new command message from the transmitter. Clock pulses from master clock 204 synchronize and cycle the complete comparator operation.

While there have been shown and described what are at present considered to be the preferred embodiments of the invention, it will be understood by those skilled in the art that various changes and modifications may be made therein without departing from the scope of the invention as defined in the appended claims.

I claim:

1. A voice command system comprising:

first, a transmitter including a microphone for speech input, said speech consisting of a succession of syllables, an amplitude-conditioning device coupled to said microphone for equalizing the intensity of the output signals of said microphone over a large range of frequencies, a plurality of band pass filters coupled to said amplitude conditioner for analyzing speech into a spectrum, a like plurality of rectifier-low pass filter networks coupled to the band pass filters for producing a plurality of direct current voltages indicative of the components of a speech wave, an articulation detector coupled to said amplitude conditioner for measuring the duration of each syllable and producing an output voltage indicative of the end of a syllable, a plurality of audio signal sources having discrete frequencies, a separate pair of audio signal sources having discrete frequencies, a plurality of wave-shaping networks coupled to said plurality of audio signal sources for converting the outputs thereof into a plurality of rectangular waves, a separable pair of wave-shaping networks coupled to said separate pair of audio signal sources for converting the outputs thereof into a separate pair of rectanglar waves, a ratio selector device controlled by said plurality of direct current voltages and coupled to said plurality of wave-shaping networks to produce a plurality of first digital output signals indicative of the tonal components of said speech, a separate ratio selector device coupled to said separate pair of wave shapers and controlled by said articulation detector for producing second digital output signals indicative of the duration of each syllable, means for producing a radio frequency carrier, and means including a modulator and a matrix adder for recovering from the carrier and isolating a plusaid carrier;

and, second, a receiver including means including a first plurality of demodulator networks and a separate pair of demodulator networks for recovering from the carrier and isolating a plurality of modulation components correspondings to said first digital output signals and modulation components corresponding to said second digital output signals, temporary storage means coupled to said first plurality of demodulator networks for storing an encoded word, permanent storage means for storing a command consisting of a plurality of encoded words, means responsive to the second digital components for shifting each temporarily stored word from the temporary storage means to the permanent storage means, means including a counter and a comparator and a memory for comparing a received and stored command to a sequence of standard commands, and means for executing an order when the command is satisfied.

2. A voice command system per claim 1, means at the receiver responsive to the presence of modulation components representative of both of said second digital signals for releasing said storage means, and "on"-"off" switch means at the transmitter in the coupling between one of said separate pair of audio signal sources and its associated wave shaper.

3. A voice command transmitter comprising:

a microphone for speech input, said speech consisting of a succession of syllables, an amplitude-conditioning device coupled to said microphone for equalizing the intensity of the output signals of said microphone over a large range of frequencies, a plurality of band pass filters coupled to said amplitude conditioner for analyzing speech into a spectrum, a like plurality of rectifier-low pass filter networks coupled to the band pass filters for producing a plurality of direct current voltages indicative of the components of a speech wave, an articulation detector coupled to said amplitude conditioner for measuring the duration of each syllable and producing an output voltage indicative of the end of a syllable, a plurality of audio signal sources having discrete frequencies, a separate pair of audio signal sources having discrete frequencies, a plurality of wave-shaping networks coupled to said plurality of audio signal sources for converting the outputs thereof into a plurality of rectangular waves, a separate pair of wave-shaping networks coupled to said separate pair of audio signal sources for converting the outputs thereof into a separate pair of rectangular waves, a ratio selector device controlled by said plurality of direct current voltages and coupled to said plurality of wave-shaping networks to produce a plurality of first digital output signals indicative of the tonal components of said speech, a separable ratio selector device coupled to said separate pair of wave shapers and controlled by said articulation detector for producing second digital output signals indicative of the duration of each syllable, means for producing a radio frequency carrier, and means including a modulator and a matrix adder for modulating all of said digital output signals onto said carrier.

4. A voice command receiver comprising:

means including a first plurality of demodulator networks and a separate pair of demodulator networks for recovering from a carrier and isolating a plurality of first and second modulation components, temporary storage means coupled to said first plurality of demodulator networks and responsive to the first modulation components for storing an encoded word, permanent storage means for storing a received command consisting of a plurality of encoded words, means responsive to the second modulation components for shifting each temporarily stored word from the temporary storage means to the permanent storage means, means including a counter and a comparator and a memory for comparing the received and stored command to a sequence of standard commands, and means for executing an order when a standard command is satisfied.

References Cited by the Examiner

UNITED STATES PATENTS

| | | | |
|---|---|---|---|
| 2,565,540 | 8/1951 | Williams | 343—225 |
| 2,616,031 | 10/1952 | Nosker | 343—225 |
| 2,653,221 | 9/1953 | Carnahan | 325—47 |
| 2,705,321 | 3/1955 | Beck | 343—225 |

DAVID G. REDINBAUGH, *Primary Examiner.*